US012678950B2

(12) United States Patent
Menon et al.

(10) Patent No.: US 12,678,950 B2
(45) Date of Patent: Jul. 14, 2026

(54) ROBOTIC SYSTEM WITH INDEPENDENTLY CONTROLLABLE HIGHER DERIVATIVES

(71) Applicant: Dexterity, Inc., Redwood City, CA (US)

(72) Inventors: Samir Menon, Menlo Park, CA (US); Zhouwen Sun, San Mateo, CA (US)

(73) Assignee: Dexterity, Inc., Redwood City, CA (US)

( * ) Notice: Subject to any disclaimer, the term of this patent is extended or adjusted under 35 U.S.C. 154(b) by 160 days.

(21) Appl. No.: 18/099,886

(22) Filed: Jan. 20, 2023

(65) Prior Publication Data

US 2023/0264351 A1      Aug. 24, 2023

Related U.S. Application Data

(60) Provisional application No. 63/301,693, filed on Jan. 21, 2022.

(51) Int. Cl.
  B25J 9/16        (2006.01)
  B25J 9/12        (2006.01)
  B25J 19/00       (2006.01)

(52) U.S. Cl.
  CPC .............. B25J 9/1664 (2013.01); B25J 9/12 (2013.01); B25J 19/0004 (2013.01)

(58) Field of Classification Search
  CPC ........ B25J 9/1664; B25J 9/12; B25J 19/0004; B25J 9/1697; G05B 2219/39102; G05B 2219/45063
  USPC ............... 700/245, 259, 261, 263; 382/153; 901/11
  See application file for complete search history.

(56) References Cited

U.S. PATENT DOCUMENTS

| | | | | |
|---|---|---|---|---|
| 5,159,249 | A * | 10/1992 | Megherbi | .............. B25J 9/1607 |
| 7,852,030 | B2 * | 12/2010 | Kamiya | ............... B25J 19/0004 |
| | | | | 318/563 |
| 2003/0018283 | A1 * | 1/2003 | Dariush | .............. A61B 5/4528 |

(Continued)

FOREIGN PATENT DOCUMENTS

| | | |
|---|---|---|
| CN | 106573379 | 4/2017 |
| CN | 113727819 | 11/2021 |

(Continued)

OTHER PUBLICATIONS

Machine Translation of JP-2012040665-A (Year: 2012).*

*Primary Examiner* — Ellis B. Ramirez
(74) *Attorney, Agent, or Firm* — Van Pelt, Yi & James LLP

(57) ABSTRACT

A robotic system with independently controllable higher derivatives is disclosed. An indication is received of a trajectory through which an end effector comprising a robotic arm is to be moved. A plan is determined to use a combination of one or more motors and one or more energy removal devices to move one or more elements comprising the robotic arm in a manner that will result in the end effector being moved through the trajectory, including by using the one or more motors to apply torque to said one or more elements comprising the robotic arm during a first interval and using the one or more energy removal devices to remove energy from one or more of said elements during a second interval that starts after the start of the first interval. Commands to implement the plan are sent via a communication interface.

22 Claims, 4 Drawing Sheets

(56)            References Cited

U.S. PATENT DOCUMENTS

| | | | |
|---|---|---|---|
| 2013/0218332 A1* | 8/2013 | Hofmann | B25J 9/1651 |
| 2015/0290806 A1 | 10/2015 | Garde | |
| 2016/0176049 A1 | 6/2016 | Tronnier | |
| 2016/0279809 A1* | 9/2016 | Nakajima | G06V 20/10 |
| 2018/0104821 A1 | 4/2018 | Takahashi | |
| 2020/0038085 A1* | 2/2020 | Sexson | A61B 90/03 |
| 2020/0269429 A1 | 8/2020 | Chavez | |
| 2020/0338730 A1 | 10/2020 | Yamauchi | |
| 2022/0088778 A1* | 3/2022 | Sun | B25J 9/1651 |

FOREIGN PATENT DOCUMENTS

| | | | |
|---|---|---|---|
| EP | 2485875 | | 4/2013 |
| EP | 2930842 | | 10/2015 |
| JP | 2012040665 A | * | 3/2012 |
| JP | 2016059971 | | 4/2016 |
| JP | 2019076973 A | * | 5/2019 |
| JP | 2020179466 | | 11/2020 |
| JP | 2022521001 | | 4/2022 |
| WO | 2016037710 | | 3/2016 |

* cited by examiner

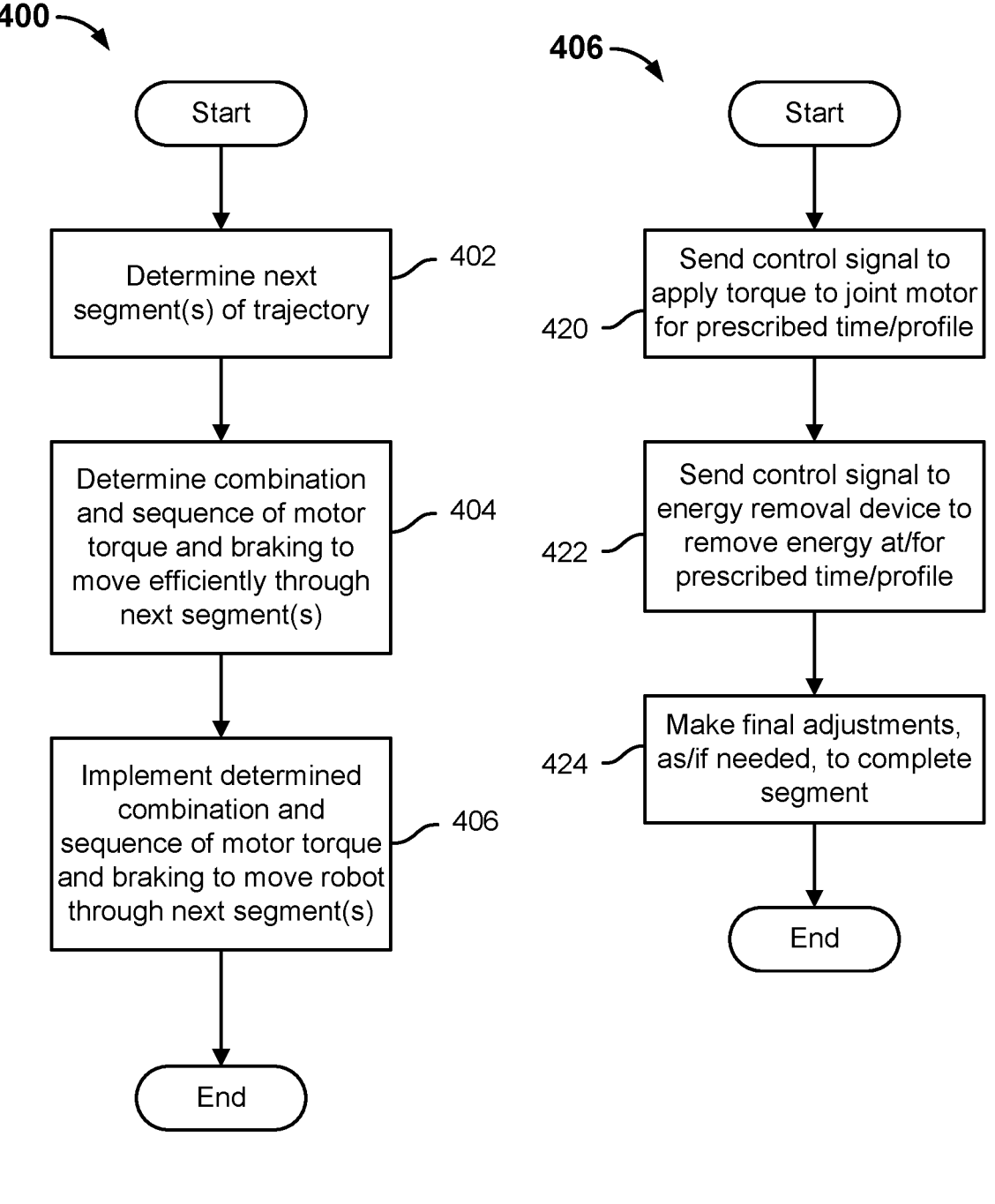
FIG. 4A              FIG. 4B

ROBOTIC SYSTEM WITH INDEPENDENTLY CONTROLLABLE HIGHER DERIVATIVES

CROSS REFERENCE TO OTHER APPLICATIONS

This application claims priority to U.S. Provisional Patent Application No. 63/301,693 entitled ROBOTIC SYSTEM WITH INDEPENDENTLY CONTROLLABLE HIGHER DERIVATIVES filed Jan. 21, 2022, which is incorporated herein by reference for all purposes.

BACKGROUND OF THE INVENTION

Robots, such as robotic arms and end effectors (e.g., suction-based, gripper, etc.) are actuated using motors, air actuated pistons, vacuum/suction, and other actuators. A robotic arm or other robot may be operated under the control of a control system, which sends commands to control operation of the actuators to move the robot, such as to grasp and move an object. A robotic control system may control one or more of the position, velocity, acceleration, or other higher derivates of motion of a robot and/or portion thereof, such as the end effector and/or the torque and/or current applied by/to the actuator.

Critical control (fast rise, critical damping, no overshoot) requires precise damping, whether controlling position, velocity, torque, current, etc. Precise damping requires estimation of derivative of controlled state, or even higher derivatives if system is more than second order and has strange dynamics.

Finding the instantaneous values of these higher derivatives is very difficult. The sensor is likely measuring state, not derivative(s) of state. Sensors are digital and algorithms are running on a CPU, having intrinsic latency. State estimation of higher derivatives is difficult and prone to errors, causing instability and erroneous energy injection when trying to control systems, such as a robotic system. Instantaneous measurement is then always late; sensors will always have noise, and differentiating noise creates very noisy results, requiring filtering and creating incorrect estimates; and CPU jitter and latency creates even higher errors in both magnitude and phase.

Finally controlling that higher derivative is the most difficult. The level one can control directly is not at the higher derivative, so it is necessary to inject energy at the right time to control the derivative state. If the amount of energy injected or timing is wrong, unexpected results are obtained, e.g., instability, poor settling time, non-optimal control, etc.

BRIEF DESCRIPTION OF THE DRAWINGS

Various embodiments of the invention are disclosed in the following detailed description and the accompanying drawings.

FIG. 4A is a flow diagram illustrating an embodiment of a process to control a robotic system with independently controllable higher derivatives.

FIG. 4B is a flow diagram illustrating an embodiment of a process to control a robotic system with independently controllable higher derivatives.

DETAILED DESCRIPTION

Figure 1A:
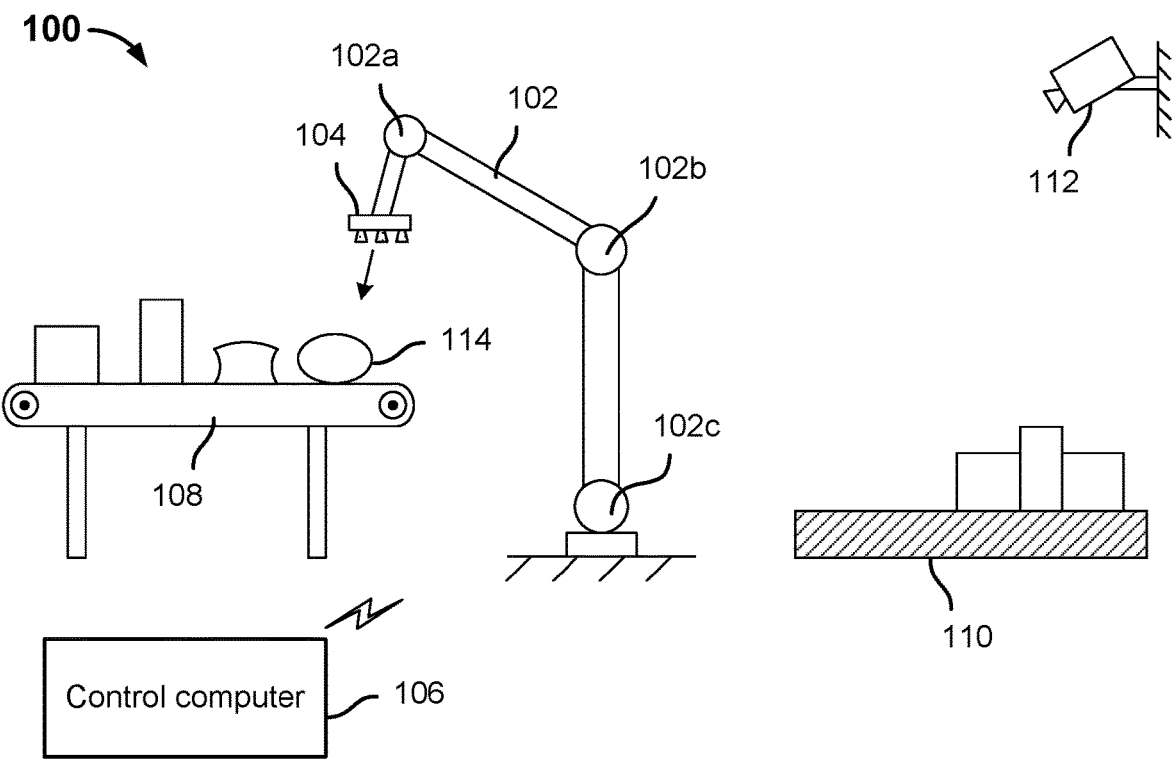
FIG. 1A is a diagram illustrating an embodiment of a robotic system with independently controllable higher derivatives.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Techniques are disclosed to control derivatives (e.g., velocity, acceleration) of robot state (e.g., position) with or without estimation of the derivative state itself. In various embodiments, one or more electrical, electromagnetic, and/or electromechanical components are provided and used to inject energy at the right time to control the derivative state. In some embodiments, passive elements are used to control dynamics of systems with guaranteed stability.

In various embodiments, robotically controlled actuators that do not require state estimation, and which work directly on the level of the higher derivative, are used. For example, in some embodiments, one or more of a variety of types of brakes may be used to reduce velocity directly.

In some embodiments, actuators that may need estimation, but are truly passive in the state they are trying to control, are used, so they are guaranteed to remain stable. Examples include, without limitation, resistors, capacitors, and other energy storage elements.

In some embodiments, motors are built that have control systems with the higher derivative control technology disclosed herein built in. Traditional drivetrain assemblies use brakes just to stop the system suddenly or get rid of regenerative braking energy. In various embodiments, braking is used as an integrated part of the control system, reducing the need for the actuator itself (e.g., robot joint motor) to slow down the system, or remove energy.

In some embodiments, a combination of brakes and purely passive elements, like braking resistors, is used to schedule the actuation at different moments in time and state for optimal usage of actuators. These higher derivative control elements have much higher capacity than the actuator, which allows motion to be damped on a dime, simplifying control and decreasing time needed to reach goal state.

In various embodiments, velocity (or other higher derivative level) control is performed at least in part as described in U.S. patent application Ser. No. 17/482,162, entitled "Velocity Controlled-based Robotic System," filed Sep. 22, 2021, published at US 2022-0088778, on Mar. 24, 2022, the entire contents of which is incorporated herein by reference for all purposes.

In various embodiments, a brake or similar energy removal system is used to directly control velocity by removing energy using a structure that cannot add energy. Traditionally, reverse motor torque has been used to slow and stop the movement of the robotic arm. However, latency in taking measurements or signal noise (especially at low speeds) can result in errors in estimating velocity. If movement has oscillated such that the robot/component thereof is moving in a direction opposite of what was estimated, applying torque intended to slow movement could instead add energy and increase movement, resulting in instability and delay as the system adjusts and damps the oscillations. Using a brake or similar device or system that can only remove energy guarantees such a result or condition will not occur.

In some embodiments, a braking system as disclosed herein applies braking force to a motor or motor shaft. In some embodiments, the motor and motor shaft drive a reduction gearbox that in drives the joint, and the braking force disclosed herein is applied at the output side of the gearbox, reducing wear and tear on the gearbox (e.g., as compared to using the motor to apply reverse torque to remove energy).

FIG. 1A is a diagram illustrating an embodiment of a robotic system with independently controllable higher derivatives. In the example shown, robotic system and environment 100 includes a robotic arm 102 having a suction-type end effector 104. The robotic arm 102 includes a plurality of segments connected by joints 102a, 102b, and 102c. In some embodiments, robotic arm 102 comprises a six degree of freedom (DOF) industrial robot. In some embodiments, robotic arm 102 comprises more or fewer than six degrees of freedom. Motors and associated motor controllers are included at each of the joints 102a, 102b, and 102c to bend or rotate associated segments of robotic arm 102, e.g., by supplying voltage and current to the motor to apply a torque to move the associated segment in one of the six (or more) degrees of freedom.

In the example shown, robotic arm 102 and end effector 104 are in wireless communication with control computer 106. In some embodiments, control computer 106 is integrated into and/or with robotic arm 102. For example, control computer 106 may be an internal processor comprising robotic arm 102 or a processor or computer mounted on or in the same chassis as robotic arm 102.

In the context shown in FIG. 1A, robotic arm 102 and end effector 104 are configured to be used, under control of control computer 106, to pick items from conveyor 108 and place them on pallet 110. Three (or two) dimensional image/depth data from camera 112 is received by control computer 106 and used to generate a three-dimensional view of the workspace shown in FIG. 1A. In various embodiments, control computer 106 includes a computer vision subsystem configured to construct such a view. The image data is used by control computer 106, in various embodiments, to identify an item, such as item 114 in the example shown, as a next item to be picked/placed. The image data and/or other sensor and/or stored data may be used to determine one or more attributes of the item 114, such as size, shape, weight, material, rigidity, etc. Such attributes may be used to determine a strategy to grasp, move, and/or place the item 114. Additional attributes, such as weight and quality of grasp (e.g., suction as measured by pressure sensors), may be determined once the item 114 has been grasped.

In various embodiments, control computer 106 determines a plan and strategy to grasp an item, such as item 114. As shown in FIG. 1A, the end effector 104 is being moved in the direction of item 114, as indicated by the arrow emanating from near the end effector 104. In various embodiments, robotic arm 102 includes at one or more of the joints 102a, 102b, and 102c, and for each degree of freedom at each such joint, a motor and associated control to apply torque to move associated elements comprising the robotic arm 102 in a first (e.g., forward) direction and a braking or other energy removal device (and associated actuator) configured to apply energy in a (reverse) direction opposite the first direction. The control computer uses a model of the robotic arm 102 and its motors and braking devices to determine and implement a sequence of control commands to activate the joint motors, or a subset thereof, to move the end effector 104 along a trajectory to a position from which the item 114 can be grasped. The end effector 104 is moved relatively quickly, e.g., achieving at or near a maximum velocity, to a position relatively near to the item 114, followed by precisely timed actuation of the braking (or other energy removal) system to enable the velocity of the end effector 104 to be reduced to zero, without overshoot or oscillation, relatively near to the item 114.

Once the item 114 has been grasped, e.g., by moving the suction cups on the underside of end effector 104 into contact or proximity with the item 114 and applying suction to grasp the item 114, the item 114 is moved along a trajectory to a destination location at which the item 114 is to be placed. In various embodiments, a maximum velocity at which the item 114 and end effector 104 are to be moved through the workspace is determined, e.g., based on one or more attributes or limits of the robotic arm 102, end effector 104, and/or item 114. For example, the maximum velocity may be lower if the item 114 is heavy or if pressure sensors indicate the grasp is not strong.

Figure 1B:
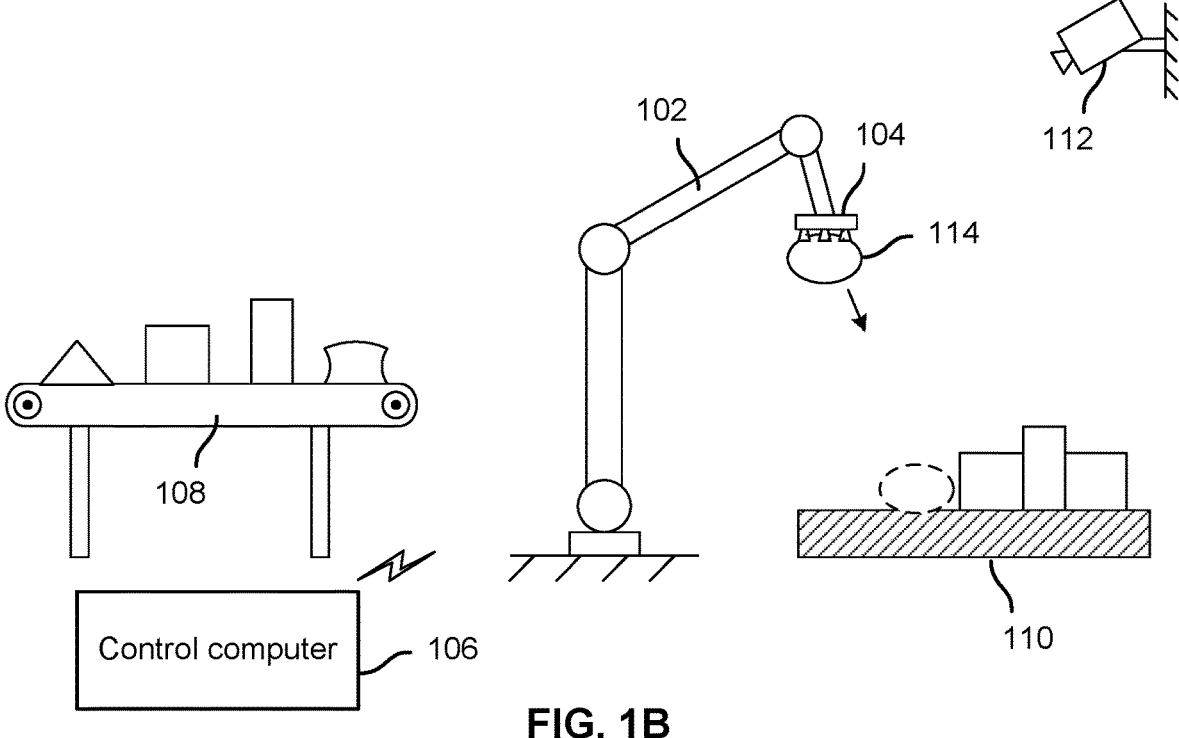
FIG. 1B is a diagram illustrating an embodiment of a robotic system with independently controllable higher derivatives.

FIG. 1B is a diagram illustrating an embodiment of a robotic system with independently controllable higher derivatives. In the example and state shown in FIG. 1B, the item 114 has been grasped and is being moved to a determined destination location, indicated by the outline shown as dashed lines on the upper surface of pallet 110. The arrow emanating from near end effector 104 indicates a vector along which the item 114 is being moved to the destination location. In various embodiments, the item 114 is moved at or approaching a maximum velocity, such as a maximum velocity of the robotic arm 102 or a maximum velocity determined for moving item 114 in the conditions shown.

In various embodiments, the trajectory and associated planned control signals to move item 114 to the destination location includes applying (at or approaching maximum) torque to one or more motors associated with joints 102*a*, 102*b*, and/or 102*c* during at least a portion of a first interval and actuating braking or other energy removal devices in a second interval that starts after the start of the first interval. The braking or other energy removal devices control velocity directly, enabling the robotic arm 102 and end effector 104 to be moved at or near top speeds, and for velocity to be reduced relatively quickly, with or without the ability to measure or estimate velocity.

Figures 2, 3:
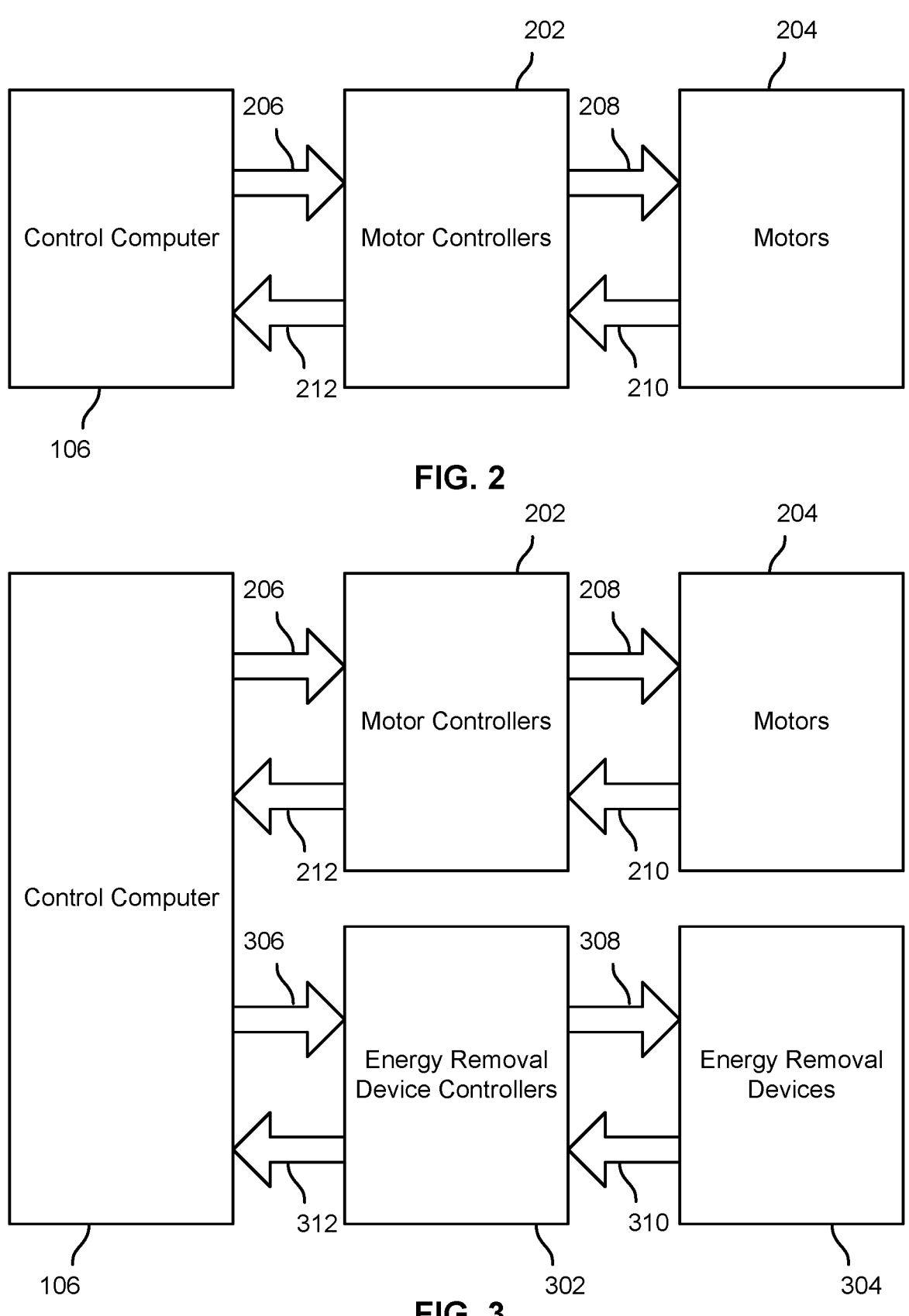
FIG. 2 is a diagram illustrating an embodiment of robotic system control elements.
FIG. 3 is a diagram illustrating an embodiment of a robotic system with independently controllable higher derivatives.

FIG. 2 is a diagram illustrating an embodiment of robotic system control elements. In the example shown, control computer 106 sends (e.g., digital) control signals 206 to motor controllers 202, which control motors 204. For example, each of joints 102*a*, 102*b*, and 102*c* may have one or more motors 204, and each such motor may have an associated motor controller 202. Motor controllers 202 provide voltage, current, and/or other analog or low level inputs to motors 204, to cause the motors 204 to operate for a controlled interval and/or applying a controlled amount of torque. Motors 204 optionally provide position, temperature, velocity, or other feedback 210 to controllers 202, which optionally provide associated feedback signals 212 to the control computer 106.

The feedback 210, 212 in various embodiments may include position or other information usable to estimate state. However, as noted above, the measured information may be inaccurate and there would always be some latency to translate the measured state information into estimated state of the robot and/or its component elements, in particular for velocity or other higher derivatives of position. In various embodiments, velocity control is provided as disclosed herein, without (necessarily) estimating the higher derivatives of state, enabling more efficient and optimized use of the robot, including by controlling the robot using velocity (or other higher derivative) control.

FIG. 3 is a diagram illustrating an embodiment of a robotic system with independently controllable higher derivatives. In the example shown, in addition to the control and motive elements shown in FIG. 2, the control computer 106 is configured to provide control signals 306 to energy removal device controllers 302 configured to actuate energy removal devices 304, e.g., one or more brake systems or devices, by sending lower-level signals 308 and/or applying voltages, current, pneumatic pressure, etc. to actuate the energy removal device 304.

In the example shown, energy removal devices 310 may provide measured information 310 to the energy removal device controllers 302, which in turn may provide state information 312 to the control computer 106. Information 310, 312 may be used, in various embodiments, to monitor and control operation of the energy removal devices 304.

Calculating velocity of a robotic element, such as an end effector or joint, is hard and controlling it is even harder. To remove velocity from a robotic system, in various embodiments, force is applied in the opposite direction of robot/joint motion.

If velocity is oscillating, applying force must be timed precisely and doing so out of phase increases velocity instead of decreasing it. So, in a traditional robot that only has a joint motor, for example, it is difficult to slow it down precisely, especially if undergoing vibrations, through just applying current in the motor. A solution disclosed herein, as implemented in some embodiments, is to have braking systems or other energy removal systems or device to remove velocity. In various embodiments, control input that is directly proportional to the amount of velocity to be removed is determined and applied to the braking system. Examples of such a braking system or device include, without limitation, eddy current brakes, brake resistors, and other non-contact brakes; and disk brakes and other friction-based brakes.

In some embodiments, an eddy current brake is used to remove energy from a robotic arm element, such as a joint driven by a joint motor. An eddy current brake, also known as an induction brake, electric brake, or electric retarder, is a device used to slow or stop a moving object by generating eddy currents. In some embodiments, a non-ferromagnetic conductive disc rotates perpendicularly through a toroidal magnetic field. As the disc rotates, it induces eddy currents. Power is then dissipated throughout the disk to produce a braking torque force.

In various embodiments, braking systems described herein do not require estimation of velocity, since engaging them directly removes velocity/energy. In various embodiments, the braking systems are engaged selectively, while our actuator (motor, etc. . . . ) is adding energy to remove the damping term in the control of the motor, thereby removing the velocity estimation step and the need for motor current to damp. In various embodiments, precisely controlled versions of these braking systems are used to control velocity/energy removal accurately instead of just a generic "brake".

Other ways of removing energy but still being passive include braking resistors on motors. A motor has coils turning inside magnetic fields, and a coil turning inside a magnetic field induces an electromotive force (EMF). This EMF, known as the "back EMF," acts against the applied voltage that is causing the motor to spin in the first place, and reduces the current flowing through the coils of the motor. Motor back EMF voltage is directly proportional to motor velocity. In various embodiments, resistance is selectively engaged across the motor wiring to remove energy and decrease velocity.

FIG. 4A is a flow diagram illustrating an embodiment of a process to control a robotic system with independently controllable higher derivatives. In various embodiments, the process 400 of FIG. 4A may be implemented by a control computer, such as control computer 106 of FIGS. 1A and 1B. In the example shown, at 402 the next segment(s) of the trajectory are determined. For example, referring to FIG. 1A, the trajectory to move the end effector 104 from the position shown to the grasp location adjacent to item 114 may be determined. At 404, a combination and sequence to apply motor torque and braking is determined, e.g., for each of one or more motors and/or joints comprising robotic arm 102, to move the end effector 104 through the planned trajectory. In various embodiments, a model of the robotic arm 102 and its motors, controllers, a braking system may be used to determine an at least locally optimal and/or feasible sequence to apply motor torques and braking to move the elements of the robotic arm 102 in coordination to move the end effector 104 along the determined trajectory/segment. At 406, the determined sequence of motor and braking system controls is implemented to apply torques and remove energy through braking, in synchronization, to quickly move the end effector 104 through the determined trajectory/segment.

FIG. 4B is a flow diagram illustrating an embodiment of a process to control a robotic system with independently controllable higher derivatives. In various embodiments, the process of FIG. 4B implements step 406 of FIG. 4A. In the example shown, at 420 for each of one or more motors corresponding signals to apply torque, in indicated amounts and for indicated times, are sent to associated motor controllers. At 422, control signals are sent to braking systems (or other energy removal systems or devices) to remove energy at prescribed times and/or according to prescribed profiles (e.g., varying the degree or amount of energy removal over time—e.g., how much braking force is applied, over time). In various embodiments, the braking force(s) begin to be applied after the corresponding motor torques have been applied, e.g., for an indicated or computed interval. At 424, final adjustments may be made, as/if needed, to complete the trajectory/segment. For example, if the braking causes the end effector to stop just short of the final position, low amounts of torque may be applied for short intervals to move the end effector 104 more fully into place. In the case of a placement, force control may be used to snug the item, such as item 114, into position, e.g., adjacent one or more items that were placed previously.

Figure 5A:
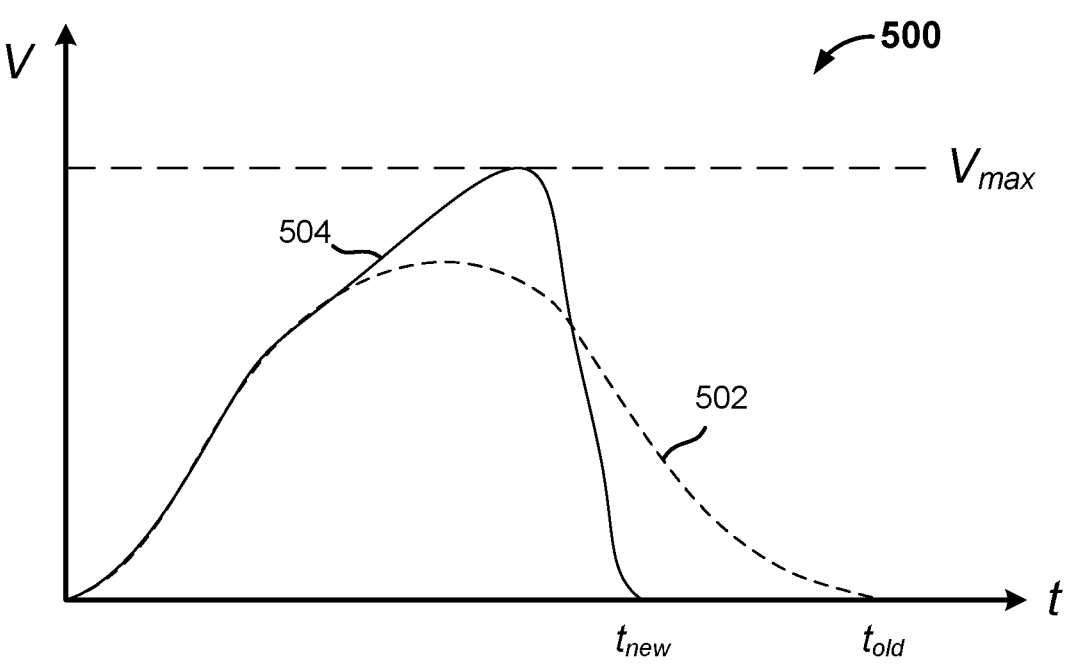
FIG. 5A illustrates a comparison of a velocity profile of a traditional robot to a velocity profile of a robotic system with independently controllable higher derivatives.

FIG. 5A illustrates a comparison of a velocity profile of a traditional robot to a velocity profile of a robotic system with independently controllable higher derivatives. The x-axis corresponds to time and the y-axis indicates velocity, such as velocity of the end effector 104, or velocity of the joint actuator (e.g., motor or gearbox output shaft), or velocity of a structure comprising or coupled mechanically to the joint. The horizontal line "Vmax" indicates the maximum velocity, which may reflect one or more of a physical limitation of the robotic arm 102 and a maximum velocity at which the end effector 104 (or other structure) should be moved given one or more attributes of the item being moved, such as weight, and/or dynamically measured/determined factors, such as quality of the grasp. The curve 502, shown in dashed lines, illustrates and example of the velocity over time to move an item from a starting position {x0, y0, z0} to end position {x1, y1, z1} using velocity (or other) control without use of energy removal systems/devices as disclosed herein. In the illustrative example shown, the end effector 104 (or other structure) never reaches its maximum speed, Vmax, before it is necessary to begin to reduce the velocity to enable zero velocity to be achieved as the end effector 104 reaches the end position {x1, y1, z1}, at time $t_{old}$ in this example.

The solid curve 504 illustrates the velocity profile that may be realized to move the same item from starting position {x0, y0, z0} to end position {x1, y1, z1} using velocity (or other) control while using energy removal systems/devices as disclosed herein. In the example shown, the end effector (or other structure) accelerates in the same manner as shown in curve 502, since the same actuator (e.g., motor) is used, but the structure continues to accelerate to achieve a velocity at/near the maximum velocity Vmax, which in various embodiments may be sustained for an interval, before velocity is reduced, rapidly and directly, by actuation of the braking system (or other direct energy removal device/system). Use of techniques disclosed herein enables the item to reach end position {x1, y1, z1} by time $t_{new}$, much sooner than if braking/energy removal were not used, as shown by curve 502.

Figure 5B:
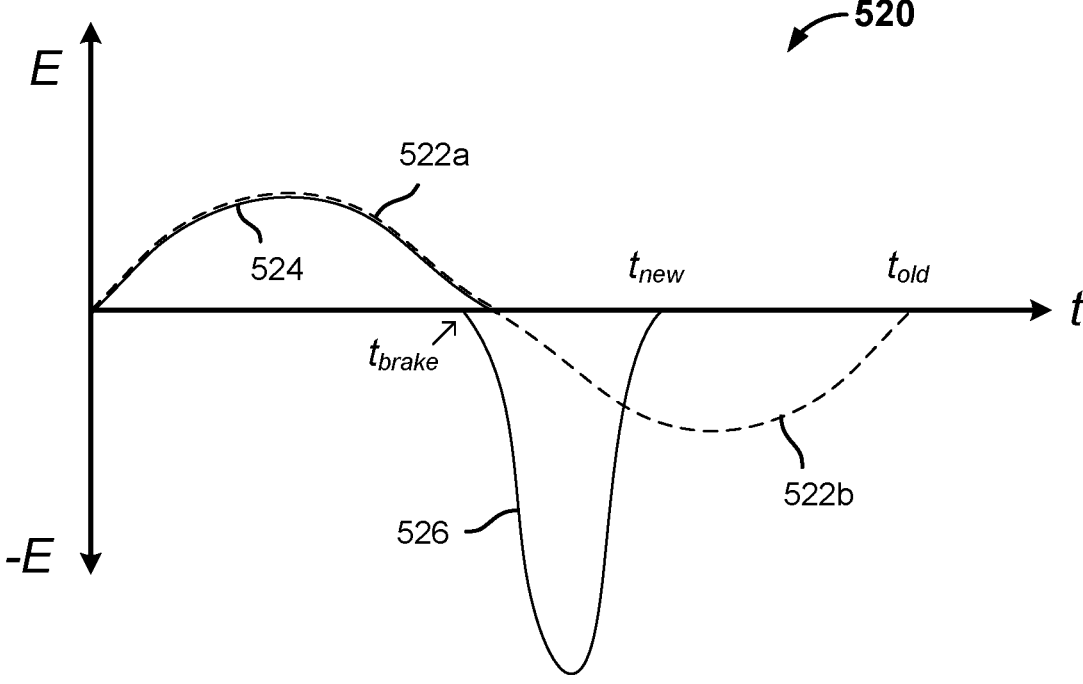
FIG. 5B illustrates energy applied by actuators and braking elements to control a robotic system with independently controllable higher derivatives.

FIG. 5B illustrates energy applied by actuators and braking elements to control a robotic system with independently controllable higher derivatives, as a function of time (or position). In various embodiments, FIG. 5B shows the energy addition and removal profiles associated with the velocity profiles shown in FIG. 5A. In the example shown, curve 522, shown as a dashed line comprising a first (left/energy addition) portion 522a and a second (right/ energy removal) portion 522b, illustrates the application of torque, without direct energy removal using a brake or other energy removal system, as described herein, to achieve the velocity profile 502 of FIG. 5A. Portion 522a shows the energy added by applying torque using a joint motor, for example, and portion 522b shows removal of energy, such as by applying torque in an opposite direction.

Curve 524 illustrates the application of torque in synchronization with the direct removal of energy, e.g., by braking, as represented by curve 526, to achieve the velocity profile represented by curve 504 of FIG. 5A by directly reducing the velocity of the end effector through energy removal (e.g., braking). Energy is added in a similar manner, as shown by the concurrence of curve 524 with curve portion 522a but using a brake or other direct energy removal system as disclosed herein enables energy to be removed much more directly and quickly, without risk of overshoot or error, to achieve full energy removal by time $t_{new}$.

While in FIG. 5B the brake is shown as being applied at time $t_{brake}$, such that the braking overlaps with the application of torque as represented by curve 524, in various embodiments, the torque application interval may or may not overlap with the brake application interval.

Using techniques disclosed herein, velocity control can be implemented without necessarily and/or quickly/accurately estimating the state of a robotic system and/or derivate state such as velocity. Active and/or passive elements are used, in various embodiments, to remove energy from elements comprising the robot, such as any given motor or joint, enabling velocity to be controlled directly, with or without estimating velocity or other derivative state. Such direct control of velocity (or higher derivatives) without dependence on state estimation enable velocity and higher derivative control to be implemented and may enable the robotic arm or other robot to be used more effectively and/or optimally, such as by enabling higher end effector speeds to be attained before the energy removal system is used to slow/stop the end effector, which in turn may enable higher throughput and utilization to be achieved. In various embodiments a very stiff, high performance, high gain system is able to be provided, since the control structures and techniques disclosed herein enable such a system to be controlled precisely.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A robotic system, comprising:

a communication interface; and a processor coupled to the communication interface and configured to:

receive an indication of a trajectory through which an end effector comprising a robotic arm is to be moved;

determine a plan to use a combination of one or more motors and one or more direct energy removal devices other than the one or more motors to move one or more elements comprising the robotic arm in a manner that will result in the end effector being moved through the trajectory, including by using the one or more motors to apply torque to said one or more elements comprising the robotic arm during a first interval to cause the velocity of the end effector to increase to a maximum velocity as the end effector moves through a first segment of the trajectory and using the one or more direct energy removal devices to remove energy from one or more of said elements during a second interval that starts after the start of the first interval to cause the velocity of the end effector to decrease as the end effector moves through a second segment of the trajectory and to come to an end effector velocity of zero at an end location associated with an end of the trajectory; and send via the communication interface commands to implement the plan;

wherein the direct energy removal devices are configured to remove but not add energy and using the one or more direct energy removal devices to remove energy from one or more of said elements during the second interval comprises determining and applying a control input that is directly proportional to the amount of velocity to be removed; and wherein said one or more direct energy removal devices are engaged selectively, while the said one or more motors are adding energy, removing the need to estimate velocity and the need to use motor current to damp.

2. The system of claim 1, wherein the trajectory comprises a segment of a larger trajectory.

3. The system of claim 1, wherein the processor is configured to determine the trajectory.

4. The system of claim 1, wherein the commands to implement the plan include a first set of commands to cause the one or more motors to apply torque to said one or more elements comprising the robotic arm during the first interval.

5. The system of claim 4, wherein the first set of commands comprises one or more commands each sent via the communication interface to a corresponding motor controller.

6. The system of claim 5, wherein the commands to implement the plan include a second set of commands to cause the one or more energy removal devices to remove energy from one or more of said elements during the second interval.

7. The system of claim 1, wherein the second interval starts prior to the end of the first interval.

8. The system of claim 1, wherein the second interval does not overlap with the first interval.

9. The system of claim 1, wherein the energy removal devices comprise brake systems or devices.

10. The system of claim 1, wherein the energy removal devices directly control the velocity of the one or more elements comprising the robotic arm.

11. The system of claim 1, wherein the energy removal devices directly control the velocity of the end effector.

12. The system of claim 1, wherein the plan to use a combination of one or more motors and one or more energy removal devices to move one or more elements comprising the robotic arm is determined without estimating the state of the robotic system.

13. The system of claim 1, wherein the plan to use a combination of one or more motors and one or more energy removal devices to move one or more elements comprising the robotic arm is determined without estimating the derivative state of the robotic system.

14. The system of claim 1, wherein using the combination of one or more motors and one or more energy removal devices to move one or more elements comprising the robotic arm enables the end effector to be moved through the trajectory in less time than would be required if only the one or more motors were used.

15. The system of claim 1, wherein using the combination of one or more motors and one or more energy removal devices to move one or more elements comprising the robotic arm increases throughput of the robotic system as compared to the throughput that would be achieved if only the one or more motors were used.

16. A method to control a robotic system, comprising:

receiving an indication of a trajectory through which an end effector comprising a robotic arm is to be moved;

determining a plan to use a combination of one or more motors and one or more direct energy removal devices other than the one or more motors to move one or more elements comprising the robotic arm in a manner that will result in the end effector being moved through the trajectory, including by using the one or more motors to apply torque to said one or more elements comprising the robotic arm during a first interval to cause the velocity of the end effector to increase to a maximum velocity as the end effector moves through a first segment of the trajectory and using the one or more direct energy removal devices to remove energy from one or more of said elements during a second interval that starts after the start of the first interval to cause the velocity of the end effector to decrease as the end effector moves through a second segment of the trajectory and to come to an end effector velocity of zero at an end location associated with an end of the trajectory; and sending via a communication interface commands to implement the plan;

wherein the direct energy removal devices are configured to remove but not add energy and using the one or more direct energy removal devices to remove energy from one or more of said elements during the second interval comprises determining and applying a control input that is directly proportional to the amount of velocity to be removed; and wherein said one or more direct energy removal devices are engaged selectively, while the said one or more motors are adding energy, removing the need to estimate velocity and the need to use motor current to damp.

17. The method of claim 16, wherein the commands to implement the plan include a first set of commands to cause the one or more motors to apply torque to said one or more elements comprising the robotic arm during the first interval.

18. The method of claim 17, wherein the first set of commands comprises one or more commands each sent via the communication interface to a corresponding motor controller.

19. The method of claim 18, wherein the commands to implement the plan include a second set of commands to cause the one or more energy removal devices to remove energy from one or more of said elements during the second interval.

20. A computer program product embodied in a non-transitory computer readable medium and comprising computer instructions for:

receiving an indication of a trajectory through which an end effector comprising a robotic arm is to be moved;

determining a plan to use a combination of one or more motors and one or more direct energy removal devices other than the one or more motors to move one or more elements comprising the robotic arm in a manner that will result in the end effector being moved through the trajectory, including by using the one or more motors to apply torque to said one or more elements comprising the robotic arm during a first interval to cause the velocity of the end effector to increase to a maximum velocity as the end effector moves through a first segment of the trajectory and using the one or more direct energy removal devices to remove energy from one or more of said elements during a second interval that starts after the start of the first interval to cause the velocity of the end effector to decrease as the end effector moves through a second segment of the trajectory and to come to an end effector velocity of zero at an end location associated with an end of the trajectory; and sending via a communication interface commands to implement the plan;

wherein the direct energy removal devices are configured to remove but not add energy and using the one or more direct energy removal devices to remove energy from one or more of said elements during the second interval comprises determining and applying a control input that is directly proportional to the amount of velocity to be removed; and wherein said one or more direct energy removal devices are engaged selectively, while the said one or more motors are adding energy, removing the need to estimate velocity and the need to use motor current to damp.

21. The system of claim 1, wherein the second interval overlaps with the first interval.

22. The system of claim 21, wherein during a portion of the second interval that overlaps with the first interval one or more of said direct energy removal devices are removing energy from an associated joint at a same time that a corresponding one or more of said motors are adding energy to the associated joint.

* * * * *